United States Patent [19]
Suzuki et al.

[11] Patent Number: 4,718,223
[45] Date of Patent: Jan. 12, 1988

[54] FRUIT HARVESTING APPARATUS

[75] Inventors: Hiroshi Suzuki, Tondabayashi; Shigeaki Okuyama, Kawachinagano; Yoshihiro Ueda, Sakai; Yoshifumi Yukishige; Masahiko Hayashi, both of Toyonaka, all of Japan

[73] Assignee: Kubota, Ltd., Osaka, Japan

[21] Appl. No.: 920,653

[22] Filed: Oct. 20, 1986

[30] Foreign Application Priority Data

| Oct. 17, 1985 | [JP] | Japan | 60-232839 |
| Oct. 18, 1985 | [JP] | Japan | 60-234125 |
| Oct. 29, 1985 | [JP] | Japan | 60-242539 |
| Nov. 7, 1985  | [JP] | Japan | 60-249785 |

[51] Int. Cl.$^4$ ............................................. A01D 46/24
[52] U.S. Cl. ........................................ 56/328.1; 56/332
[58] Field of Search .................... 56/328 R, 332, 335, 56/336

[56] References Cited

U.S. PATENT DOCUMENTS

| 1,435,534 | 11/1922 | Kostakis | 56/336 |
| 2,775,088 | 12/1956 | Bullock | 56/332 |
| 3,165,880 | 1/1965 | Buie, Jr. | 56/336 |
| 3,460,330 | 8/1969 | Black, Jr. | 56/328 R |
| 3,564,826 | 2/1971 | Middleton, Jr. | 56/328 R |
| 3,591,949 | 7/1971 | Connery | 56/332 |
| 3,756,001 | 9/1973 | Macidull | 56/332 |
| 4,425,751 | 1/1984 | Bousseau et al. | 56/10.2 |
| 4,519,193 | 5/1985 | Yoseda et al. | 56/328 R |
| 4,532,757 | 8/1985 | Tutle | 56/328 R |
| 4,674,265 | 6/1987 | Gerber | 56/328 R |

Primary Examiner—Paul J. Hirsch
Attorney, Agent, or Firm—Gifford, Groh, VanOphem, Sheridan, Sprinkle and Dolgorukov

[57] ABSTRACT

A harvesting apparatus for automatically removing fruit from its growth source comprising a harvesting hand mounted at a distal end of an articulated arm assembly, a video camera for picking up a fruit image, and a control unit for guiding the harvesting hand to the fruit in response to information provided by the video camera. The harvesting hand includes a vacuum pad for drawing and catching the fruit, and a calyx cutting device. The vacuum pad and cutting device are movable relative to each other between a first position in which the vacuum pad is disposed forwardly of the cutting device for approaching and drawing the fruit and a second position in which the cutting device is disposed forwardly of the vacuum pad for removing the fruit from its tree.

15 Claims, 10 Drawing Figures

FRUIT HARVESTING APPARATUS

BACKGROUND OF THE INVENTION (1) Field of the Invention

The present invention relates to a fruit harvesting apparatus for removing fruit from its natural habitat or tree, comprising a fruit catching device utilizing a vaccuum and a removing or cutting device for removing the fruit caught by the catching device from the tree.

An article of fruit as disclosed in this application is inclusive of any material object or product of plant growth that is useful to man, and particularly covers the edible and more or less succulent product of plant growth including those commonly understood as fruits, vegetables, nuts and the like.

(2) Description of the Prior Art

This type of harvesting apparatus is known, for example, from U.S. Pat. No. 3,564,826. In this prior patent, fruit is removed from its growth source by drawing the fruit to a cutter cap acting as vacuum pad, rotating the cutter cap carrying the fruit, and bringing the calyx of fruit into contact with a stationary blade mounted at a forward end of a cutter housing.

Further examples are disclosed in the U.S. Pat. Nos. 3,756,001 and 4,519,193 and in a Japanese patent application laid open under No. 59-106215. According to these examples, the calyx of fruit is cut by a cutter mounted at a forward end of a cutter housing while the fruit is maintained inside the cutter housing.

With this type of fruit harvesting hand, however, the calyx to be cut lies forwardly of the vaccuum catching device since the fruit is drawn to and caught by the vaccuum catching device inside the housing. Therefore, it is necessary for the fruit removing device such as a cutter to cut the calyx forwardly of the vaccuum catching device to which the fruit is drawn, hence the cutter is disposed at the forward end of the housing. However, when the harvesting hand is advanced toward the fruit to be harvested with the cutter disposed forwardly of the vaccuum catching device, the cutter or the housing could contact and injure the fruit before the fruit is drawn to the vaccuum catching device. The cutter or the cutter housing sometimes injures other fruits also while approaching the fruit to be harvested.

SUMMARY OF THE INVENTION

The object of this invention is to provide a harvesting apparatus including fruit removal means that does not injure fruit to be harvested or other fruits present in its vicinity while the harvesting apparatus approaches the fruit to be harvested.

The foregoing objective is accomplished in one embodiment by a harvesting apparatus comprising catch means for catching fruit by means of a vaccuum, removal means for removing the fruit caught by the catch means, and drive means for varying a relative position of the catch means and the removal means between a first position in which the catch means is disposed closer than the removal means is to the fruit and a second position in which the removal means is closer than the catch means is to the fruit, wherein the first position is a position for a guide operation with respect to the fruit and the second position is a position for a fruit removal operation.

Thus, according to the present invention, the relative position of the vaccuum type catch means and the fruit removal means is variable, such that the vaccuum type catch means is disposed closer than the fruit removal means is to the fruit before the fruit is caught, and the removal means is closer than the catch means to the fruit when cutting its calyx.

The fruit to be harvested and other fruits are not contacted and injured by the removal means during its approach to the fruit to be harvested since the vaccuum type catch means is disposed closer than the removal means is to the fruit. When cutting the calyx of the fruit caught by the catch means, the removal means is closer than the catch means is to the fruit. This assures removal of the fruit from its growth source without injuring the fruit.

Other objectives and advantages of the present invention will be apparent from the following description.

BRIEF DESCRIPTION OF THE DRAWINGS

The drawings illustrate an embodiment of the present invention, in which.

DESCRIPTION OF THE PREFERRED EMBODIMENT

Figure 1:
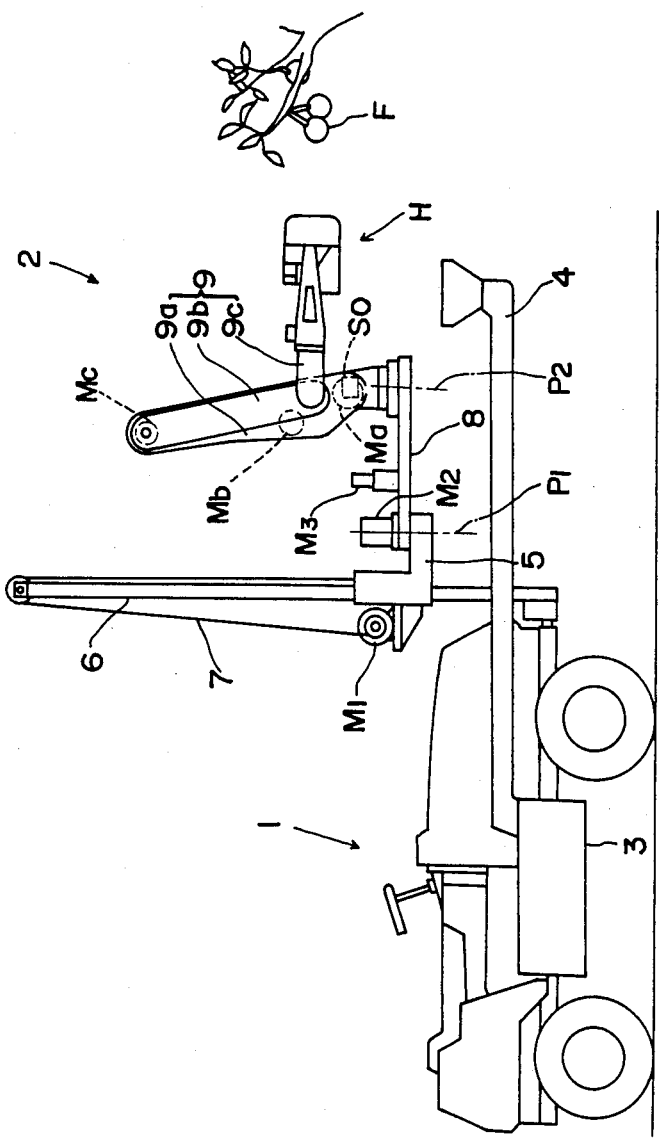
FIG. 1 is a side elevation of a fruit harvester equipped with a fruit harvesting apparatus embodying the present invention.

Referring to FIG. 1, a fruit harvester for harvesting apples, oranges and the like according to the present invention comprises a riding vehicle 1 and a fruit harvesting mechanism 2 mounted forwardly of the vehicle 1. The vehicle 1 carries a fruit container 3 for receiving fruit harvested by the fruit harvesting mechanism 2 and conveyed by a conveying device 4.

The fruit harvesting mechanism 2 includes a vertically movable boom support 5 which is guided by a guide frame 6 attached to the front end of the riding vehicle 1. The boom support 5 is operatively connected to an electric motor M1 through a chain 7 to be vertically movable to a selected position. A plate-like boom 8 is attached to the boom support 5 to be horizontally pivotable on a vertical axis P1. The plate-like boom 8 is driven by an electric motor M2 mounted on the boom support 5.

An extendible and contractible articulated arm assembly 9 is attached to a forward end of the plate-like boom 8 to be pivotable on a vertical axis P2. The arm assembly 9 is driven by an electric motor M3. The arm assembly 9 carries at a distal end thereof a harvesting hand H which is one example of fruit harvesting apparatus and includes a fruit catcher.

The arm assembly 9 comprises a first arm 9a constituting a proximal portion thereof, a second arm 9b pivotally attached to a distal end of the first arm 9a, a third arm 9c pivotally attached to a distal end of the second arm 9b, an electric motor Ma for vertically pivoting the first arm 9a relative to the plate-like boom 8, an electric motor Mb for vertically pivoting the second arm 9b relative to the first arm 9a, and an electric motor Mc for vertically pivoting the third arm 9c relative to the second arm 9b.

A video camera So is mounted in the first arm 9a to act as image pickup means for picking up the image of fruit to be harvested. The view range of this video camera So is determined by moving the vehicle 1, raising and lowering the boom support 5, horizontally pivoting the plate-like boom 8, and pivoting the arm assembly 9 horizontally and back and forth relative to the plate-like boom 8.

Figure 2:
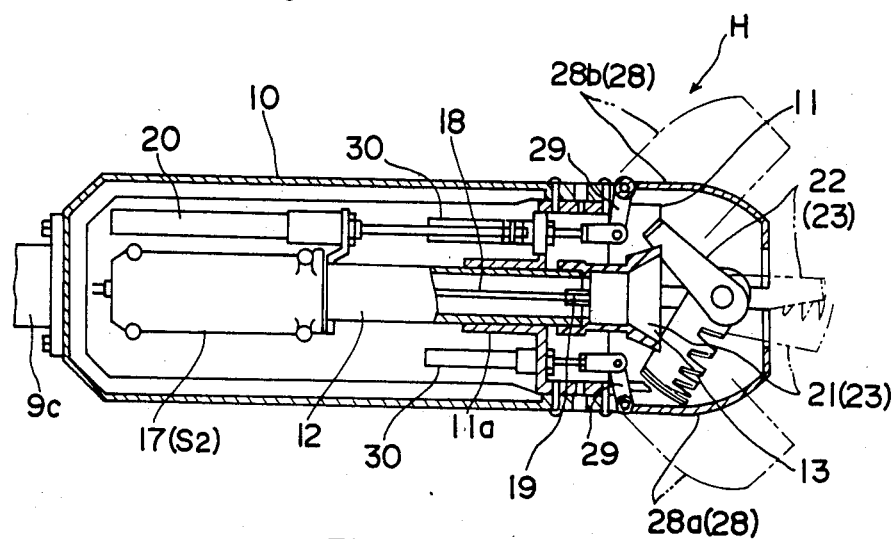
FIG. 2 is a plan view of the fruit harvesting apparatus.
Figure 3:
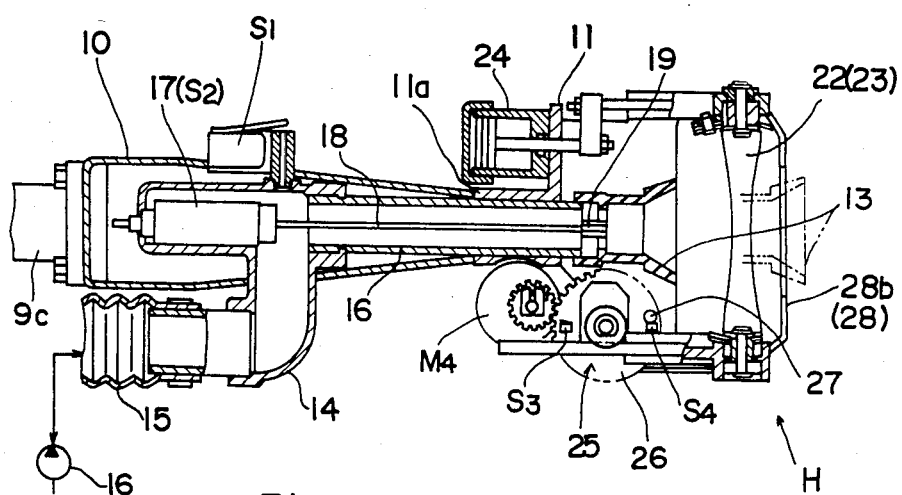
FIG. 3 is a side view of the fruit harvesting apparatus.
Figure 4:
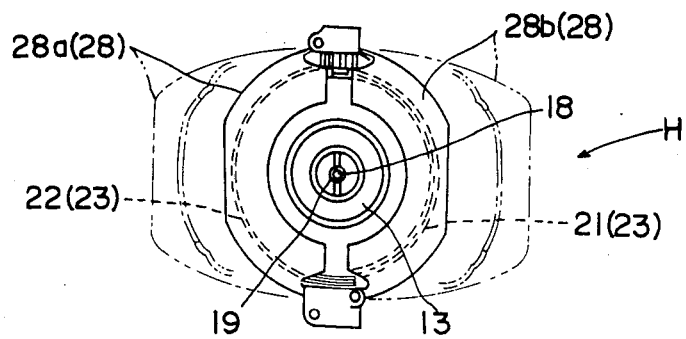
FIG. 4 is a front view of the fruit harvesting apparatus.
Figure 5:
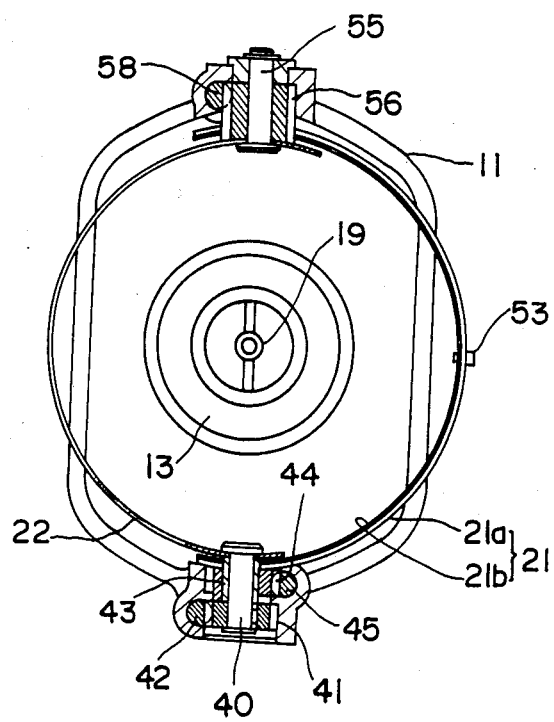
FIG. 5 is a front view in vertical section of a drive mechanism for driving a calyx cutting device according to the present invention.
Figure 6:
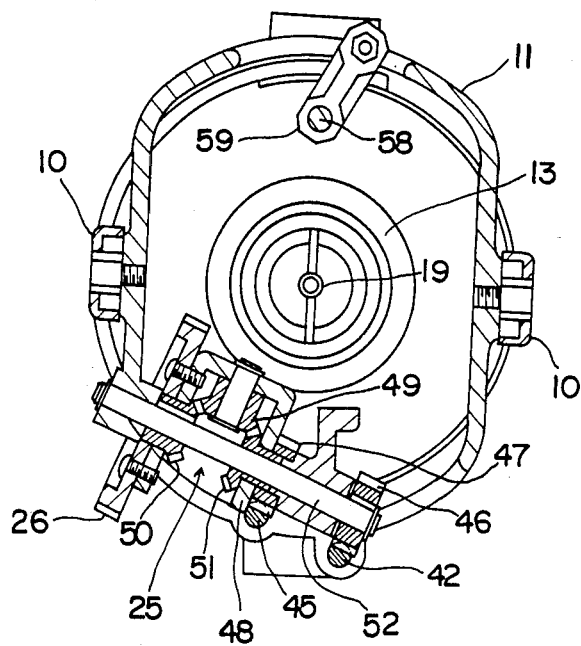
FIG. 6 is a rear view in vertical section of the drive mechanism.
Figure 7:
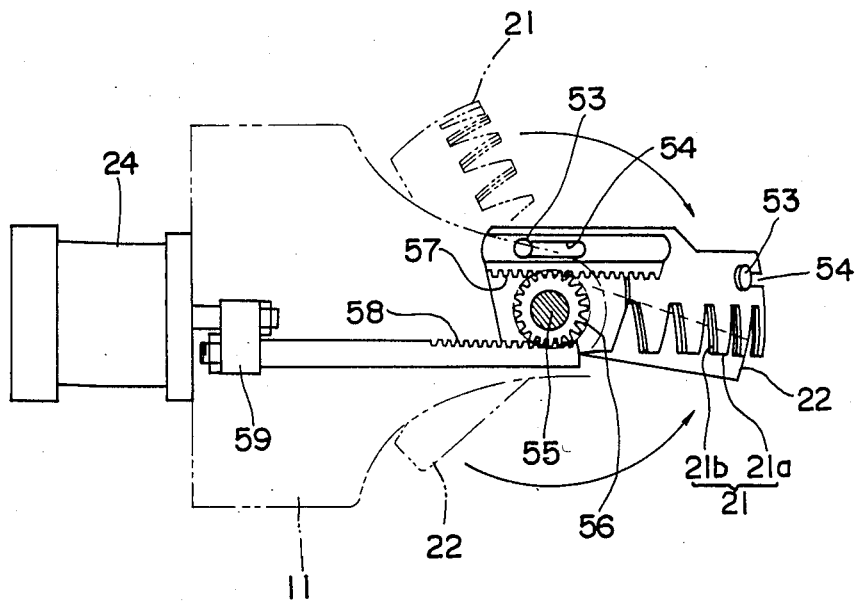
FIG. 7 is a schematic plan view of a cutter slide drive mechanism.

Referring to FIGS. 2 through 4, the harvesting hand H comprises a base frame 10 U-shaped in plan view and bolted to a distal end of the third arm 9c of the arm assembly 9, and a fruit trap case 11 bolted to a distal end of the base frame 10. An air pipe 12 is slidably received and supported by a tubular portion 11a of the fruit trap case 11. The air pipe 12 carries a vaccuum pad 13 formed of soft rubber and fitted to a distal end thereof. The air pipe 12 is fitted at a proximal end thereof with a branched air pipe 14 which is connected to a bellows type flexible hose 15. The hose 15 is connected through pipings to a suction pump 16. The branched pipe 14 includes a negative pressure sensor S1 for detecting a fruit drawn into contact with the vaccuum pad 13.

A light reflection type proximity sensor S2 is mounted centrally of an opening of the vaccuum pad 13 with a detecting side thereof facing a direction of fruit to be harvested, to indicate that the harvesting hand H is within a predetermined distance to the fruit to be harvested. More particularly, the branched pipe 14 supports therein a main sensor body 17 containing a light emitter for emitting light toward the fruit to be harvested, a light receiver for receiving the light reflected therefrom, and a circuitry and other elements for processing resulting signals. An optical fiber cable 18 for passage of the emitted and reflected light extends from the main sensor body 17 through the air pipe 12 to an inside portion of the vaccuum pad 13. The fiber cable 18 is supported at a forward end thereof by the vaccuum pad 13 through a holder 19.

An air cylinder 20 for projecting and retracting the vaccuum pad 13 is mounted between the fruit trap case 11 and air pipe 12. This air cylinder 20 is operable to slide the air pipe 12 back and forth relative to the fruit trap case 11, thereby to project and retract the vaccuum pad 13 relative to the fruit trap case 11. In practice the vaccuum pad 13 is controlled to project toward the fruit to be harvested when the harvesting hand H is guided to approach the fruit as described later, and to retract away from the fruit after the fruit is drawn into contact with the vaccuum pad 13 as also described later. This permits the vaccuum pad 13 and a cutter 21 described later to move relative to each other toward and away from the fruit. A drive mechanism therefor is referenced B in the drawings.

The fruit trap case 11 includes a calyx cutting device 23 comprising a barber's clipper type cutter 21 having an arcuate band shape and a calyx support 22 also having an arcuate band shape. More particularly, the cutter 21 and calyx support 22 are pivotally supported at opposite ends thereof by the fruit trap case 11 to be swingable on the same axis between an erected, operative position and a retracted, inoperative position, respectively. The fruit trap case 11 further includes an electric motor M4 for causing the swinging movements of the cutter 21 and calyx support 22, and an air cylinder 24 for driving the cutter 21. The cutter 21 and calyx support 22 support therebetween, when erected, the calyx of a fruit drawn to the vaccuum pad 13, and then the cutter 21 is driven to cut the calyx. The cutter 21 and calyx support 22 are operatively connected to the electric motor M4 through a differential mechanism 25. Thus, when either the cutter 21 or calyx support 22 contacts the calyx before the other, the latter is erected continuously while the former is kept standing still.

The differential mechanism 25 includes an input gear 26 carrying a projection 27 to turn on and off a switch S3 for detecting completion of the erecting operation and a switch S4 for detecting completion of the retracting operation.

The fruit trap case 11 comprises a plastic cover 28 mounted at a forward end thereof and movable between an open position and a closed position. When the vaccuum pad 13 is projected to a fruit catching position, the cover 28 covers peripheries of the calyx cutting device 23 comprising the cutter 21 and calyx support 22, with only the vaccuum pad 13 exposed from the forward end of the fruit trap case 11.

The cover 28 comprises vertically divided semispherical right and left cover members 28a and 28b in which the cutter 21 and calyx support 22 of the calyx cutting device 23 are dipsosed, respectively. The cover members 28a and 28b are pivotally supported by the fruit trap case 11 to be swingable outwardly. The cover members 28a and 28b include projections 29 at positions where the cover members 28a and 28b are pivotally supported, respectively. These projections 29 are pushed and pulled longitudinally of the fruit trap case 11 by a pair of air cylinders 30, whereby the cover 28 is opened and closed.

The drive mechanism M4 for the cutter 21 and calyx support 22 and the construction of the cutter 21 will be described next with reference to FIGS. 2 through 7. The elements associated with the cover 28 are omitted from FIGS. 4 and 5 for expediency of illustration.

As shown, the calyx support 22 has one end thereof fixed to a support pin 40 including a first input pinion 41 meshed with a first rack 42. The cutter 21 has one end thereof fixed to a tubular member 43 relatively rotatably fitted on the support pin 40, the tubular member 43 including a second input pinion 44 meshed with a second rack 45. The first rack 42 associated with the calyx support 22 is meshed with a first output pinion 46 of the differential mechanism 25, and the second rack 45 associated with the cutter 21 is meshed wtih a second output pinion 47 of the differential mechanism 25.

The differential mechanism 25 includes a differential case 48 rotatable in unison with the input gear 26, a bevel gear 49 relatively rotatably supported by the case 48, a first and a second output bevel gears 50, 51 meshed with the bevel gear 49, and a support shaft 52 carrying the first output bevel gear 50 fixed thereto and the second output bevel gear 51 relatively rotatably mounted thereon. The first output pinion gear 46 is fixed to the support shaft 52, whereas the second output pinion gear 47 is fixed to the second output bevel gear 51.

The cutter 21 comprises a pair of blade elements 21a and 21b having an arcuate band shape and connected to each other by pins 53 and slots 54 to be relatively slidable in the longitudinal direction thereof.

The calyx support 22 has the other end thereof relatively rotatably fitted on a support pin 55 including a pinion 56 fixed thereto for driving the cutter 21. One of the blade elements 21b is relatively rotatably fitted at one end thereof to the pinion 56, and the other blade member 21a includes a face gear 57 at one end thereof engageable with the pinion 56. The pinion 56 is meshed with a rack 58 connected to the cutter drive air cylinder 24 through a relay member 59.

Controls for the described construction will particularly be described hereinafter.

Figure 8:
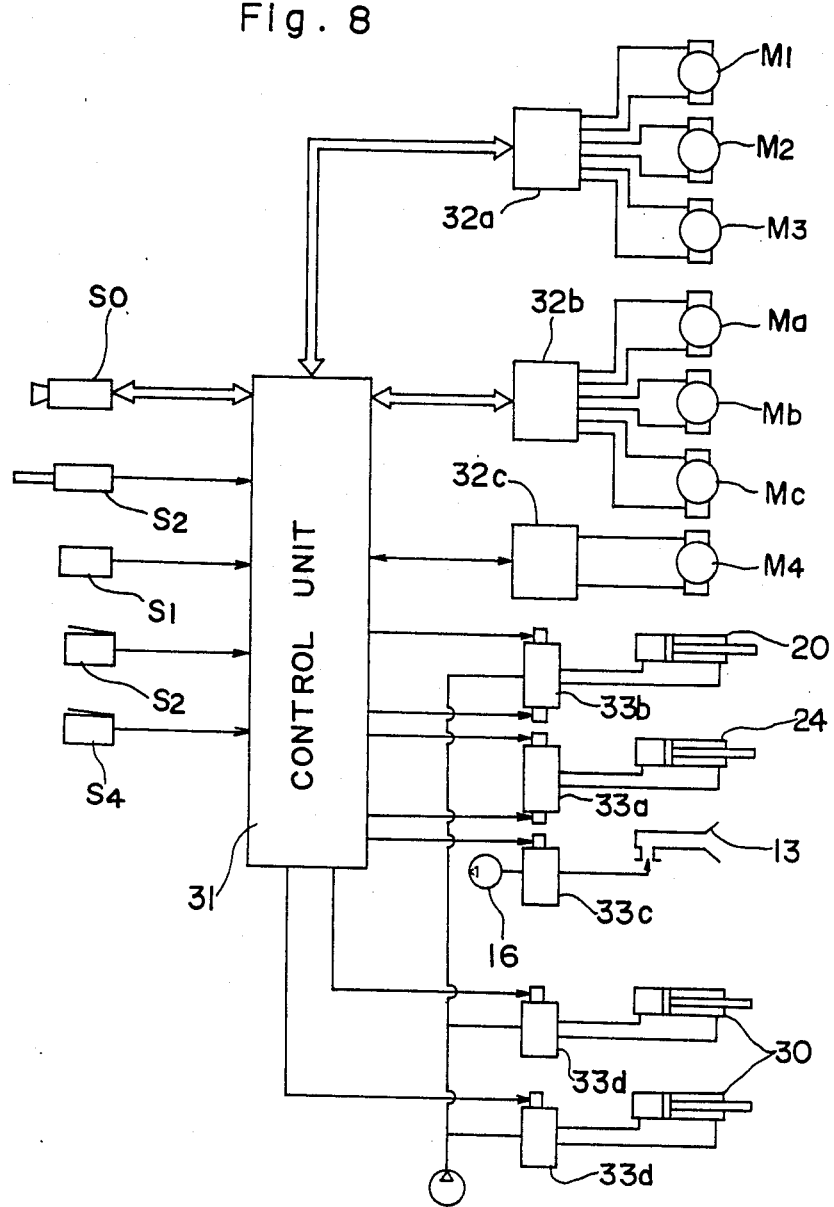
FIG. 8 is a block diagram showing a control system.

Referring to FIG. 8, a control unit 31 comprising a microcomputer receives an image pickup signal from the video camera So, a fruit detection signal from the proximity sensor S2, a fruit suction signal from the negative pressure sensor S1, detection signals from the switches S3 and S4 relating to the erection and retraction of the cutter 21 and calyx support 22. On the basis of these signals and stored data, the control unit 31 outputs control commands to a motor controller 32a for controlling the electric motors M1–M3 which raise, lower and swing the harvesting mechanism 2, a motor controller 32b for controlling the electric motors Ma–Mc which drive the arm assembly 9, a motor controller 32c for controlling the electric motor M4 which erects and retracts the cutter 21 and calyx support 22, a control valve 33a for controlling the air cylinder 24 which drives the cutter 21, a control valve 33b for controlling the air cylinder 20 which projects and retracts the vaccuum pad 13, a control valve 33c for controlling the vaccuum pad 13, and control valves 33d for controlling the cover 28, whereby the harvesting hand H is automatically guided toward fruit and automatically harvests the fruit.

In other words, the control unit 31 acts as harvesting hand guide means to guide the harvesting hand H toward fruit F to be harvested, with the suction opening of the vaccuum pad 13 facing the fruit, and harvesting hand drive means to automatically control the guided harvesting hand H to cut the calyx of fruit F and harvest the fruit.

Figure 9:
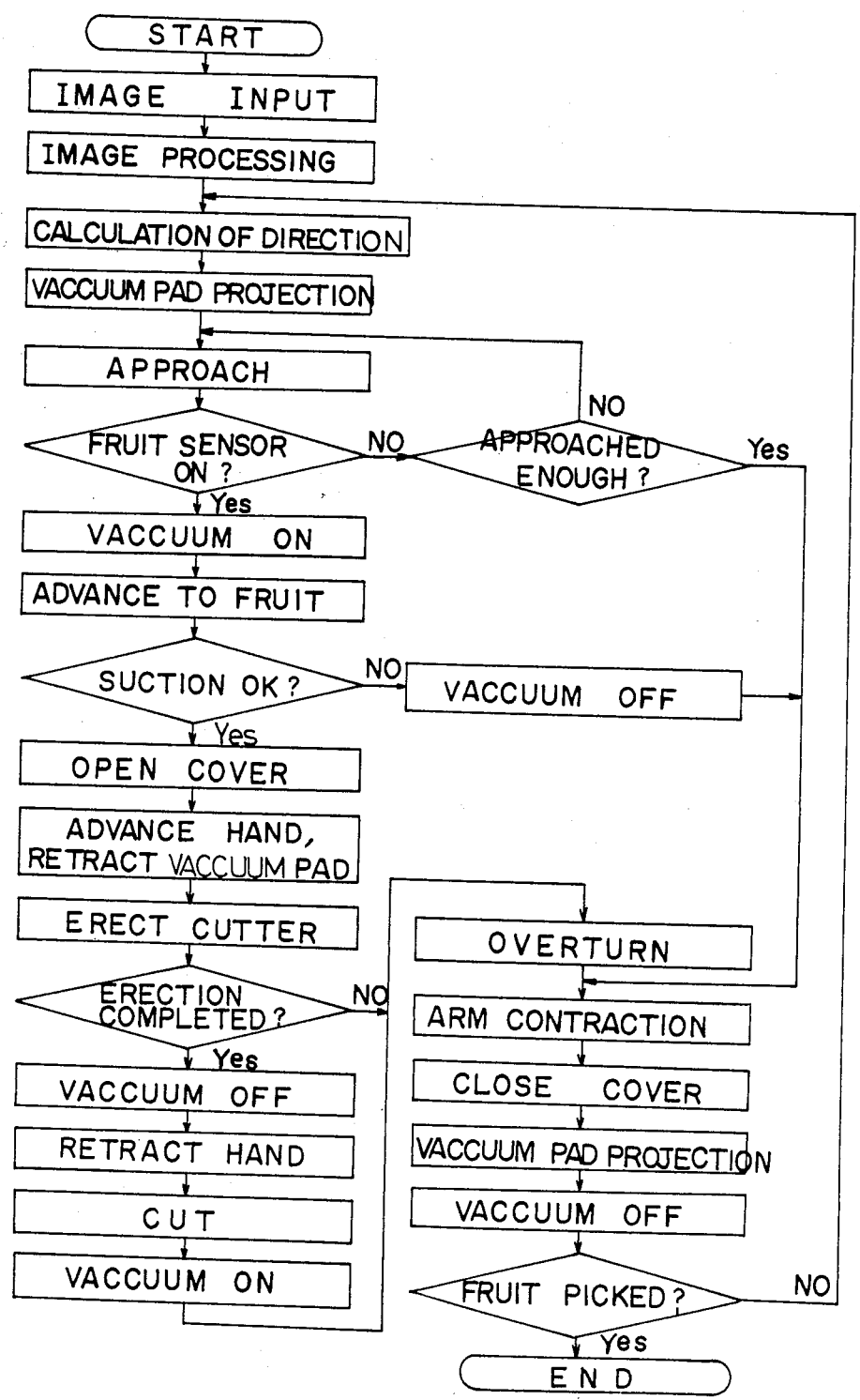
FIG. 9 is a flowchart of a control sequence for a harvesting operation.

The operation of the foregoing construction will be described with reference to the flowchart shown in FIG. 9.

First, the video camera So picks up the image of a range including fruit F to be harvested. The image is then processed to remove background elements such as branches and leaves and produce image data corresponding only to the fruit F. Thereafter the direction in which the fruit F is present is calculated.

Next, in accordance with the calculated direction, the arm assembly 9 is flexed to cause the harvesting hand H to approach the fruit F, with the cover 28 closed and the suction opening of the vaccuum pad 13 facing the fruit F.

After this approaching step, judgement is made on the basis of the detection signal provided by the proximity sensor or fruit sensor S2 whether or not the harvesting hand H is within a predetermined distance to the fruit to be harvested. If the harvesting hand H is within the predetermined distance, the vaccuum pad 13 is put into a suction operation. Where the proximity sensor S2 remains out of operation even though the harvesting hand H is within the predetermined distance to the fruit F, the arm assembly 9 is contracted to return the harvesting hand H to an approach starting position.

Figure 10:
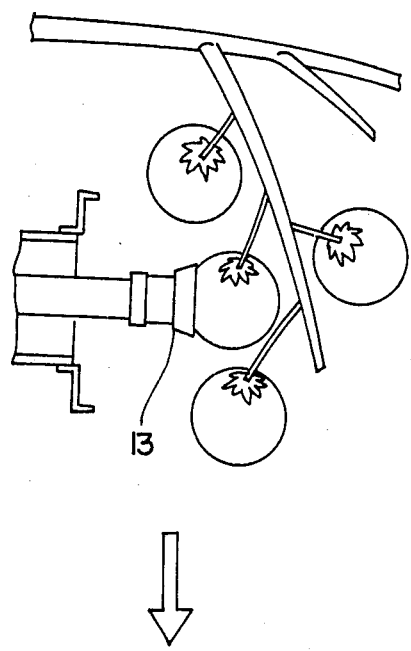
FIG. 10 is a schematic view of the harvesting apparatus in action.
Figure 10:
Figure 10:
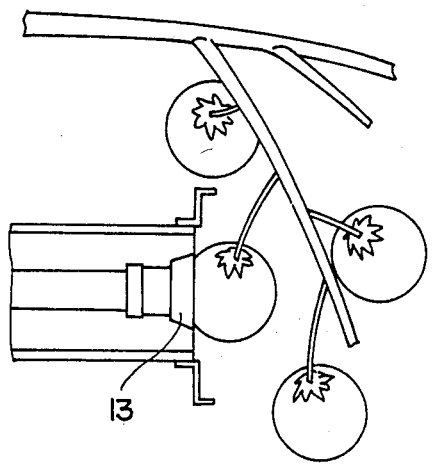

After the suction operation of the vaccuum pad 13 is started, the harvesting hand H is advanced a predetermined distance, for example 30–50 mm, toward the fruit F and judgement is made on the basis of the detection signal provided by the negative pressure sensor S1 whether or not the fruit F is in contact with the vaccuum pad 13. If the fruit F is in contact with the vaccuum pad 13 as desired, the cover control air cylinders 30 are actuated to open the cover elements 28a and 28b outwardly and the air cylinder 20 is actuated to retract the vaccuum pad 13. At the same time the harvesting hand H is advanced in a direction parallel to the direction in which the vaccuum pad 13 is projected and retracted, to take the fruit F into a working range of the cutter 21. The series of movements described above are illustrated in FIG. 10. As opposed to the described embodiment, the vaccuum pad 13 may be fixed to the harvesting hand H with the calyx cutting device 23 including the cover elements 28a and 28b arranged extendible and retractible, to realize the same function in combination with the movements of the harvesting hand H. Reverting to the above judgement as to whether or not the fruit F is in contact with the vaccuum pad 13, if the negative pressure sensor S1 remains out of operation, the vaccuum pad 13 is projected, its suction is stopped and the cover 28 is closed to discontinue the harvesting operation. Then the arm assembly 9 is contracted to return the harvesting hand H to the approach starting position.

After the fruit F to be harvested is taken into the harvesting hand H, the cutter 21 and the calyx support 22 are erected forwardly and judgement is made on the basis of the detection signal provided by the switch S3 whether or not the erection is completed. When the erection is completed, the suction operation of the vaccuum pad 13 is stopped and the harvesting hand H is retracted to place the cutter 21 in a position adjacent the proximal end of the calyx and then to operate the cutter 21 to cut the calyx. Immediately after the calyx cutting step the suction operation of the vaccuum pad 13 is resumed to draw the calyxless fruit thereto. Thereafter the cutter 21 and calyx support 22 are turned over or retracted to the inoperative positions until the switch S4 is turned on indicating completion of their retraction. Then the arm assembly 9 is contracted to return the harvesting hand H to the approach starting position. The vaccuum pad 13 is projected and its suction is stopped to permit the fruit F to be placed in the conveying device 4. Subsequently the cover 28 is closed which completes one fruit picking cycle. In case the switch S3 for detecting completion of the erection noted above does not come into operation, it is judged that trouble such as an undesirable entry of twigs or other obstructive matter has occurred. Then the cutter 21 and calyx support 22 are retracted to the inoperative positions until the switch S4 is turned on indicating completion of their retraction, the suction of the vaccuum pad 13 is stopped, and the arm assembly 9 is contracted to return the harvesting hand H to the approach starting position to discontinue the harvesting operation.

Where a plurality of fruits are included in one image signal provided by the video camera, the harvesting operation may be carried out continuously by calculating the directions such that the fruits are picked successively from the lowermost fruit to the uppermost fruit, for example, or from the fruit representing the largest image, i.e. the fruit closest to the harvesting hand H, to the one representing the second largest image and so on.

Therefore, upon completion of one picking cycle, judgement is made whether there are other, unpicked fruits in the image, and the picking operation is repeated until the image becomes void of fruit.

In the described embodiment, the cover 28 comprises the two right and left cover elements 28a and 28b which are opened and closed by the two air cylinders 30, respectively. Instead of such a construction, the two cover elements 28a and 28b may be opened and closed by a single air cylinder or by actuators such as motors. A link mechanism may be provided to open and close the cover elements 28a and 28b simultaneously with the movements of the vaccuum pad 13. The cover 28 may comprise three or more cover elements or sections instead of two. Where desirable the cover 28 may be the stationary type which does not open or close but defines an opening to permit passage of fruit.

The drive mechanism B for causing relative movements between the vaccuum pad 13 and the cutter 21 toward and away from the fruit to be harvested is briefly described as causing the vaccuum pad 13 to move relative to the cutter 21. Alternatively, the cutter 21 may be moved relative to the vaccuum pad 13. The drive mechanism B therefore may comprise, instead of air cylinder 20, a hydraulic cylinder, an electric motor or other such actuator.

The embodiment has been described in relation to the harvesting hand of a fruit harvesting mechanism, but this harvesting hand may be applied to a harvesting mechanism for tomatoes or other vegetables.

In practicing the invention various modifications may be made to the construction of harvesting hand H, the construction of arm assembly 9 acting as guide means and the constructions of other components.

What is claimed is:

1. A harvesting apparatus for automatically removing fruit from its growth source, comprising;
   catch means for catching fruit by means of a vaccuum,
   removal means for removing the fruit caught by said catch means, and
   drive means for varying a relative position of said catch means and said removal means between a first position in which said catch means is disposed closer than said removal means is to the fruit and a second position in which said removal means is closer than said catch means is to the fruit,
   wherein said first position is a position for a guide operation with respect to the fruit and said second position is a position for a fruit removal operation.

2. A harvesting apparatus as claimed in claim 1 wherein said fruit removal means includes cutter means for cutting a calyx of the fruit caught by said catch means.

3. A harvesting apparatus as claimed in claim 2 wherein said cutter means includes a pivotable clipper type cutter and a pivotable calyx support member for contacting and supporting the calyx of the fruit, said cutter and said calyx support member being pivotable to hold the calyx therebetween.

4. A harvesting apparatus as claimed in claim 3 wherein said cutter means further includes a drive mechanism for causing pivotal movements of said cutter and said calyx support member, said drive mechanism including a differential mechanism for causing the calyx to be held between said cutter and said calyx support member at a position where one of said cutter and said calyx support member comes into contact with the calyx.

5. A harvesting apparatus as claimed in claim 4 wherein said cutter includes a pair of blades having an arcuate band shape, and a drive mechanism for longitudinally sliding said blades relative to each other.

6. A harvesting apparatus as claimed in claim 3 wherein said removal means further includes a cover for covering said cover means.

7. A harvesting apparatus as claimed in claim 6 wherein said cover defines an opening to permit passage of the fruit.

8. A harvesting apparatus as claimed in claim 6 wherein said cover is operable to open and close in response to variations in the relative position between said catch means and said removal means, such that said cover is closed when said first position is established and is opened when said second position is established, said cover defining an opening to permit passage of said catch means.

9. A harvesting apparatus as claimed in claim 1 wherein said catch means includes a vaccuum pad having a semispherical shape, and an air pipe connected at one end thereof to said vaccuum pad and at the other end thereof to a vaccuum pump.

10. A harvesting apparatus as claimed in claim 9 wherein said catch means further includes a noncontact sensor for detecting the fruit having approached said vaccuum pad, and a pressure sensor for detecting the fruit drawn to said vaccuum pad.

11. A harvesting apparatus as claimed in claim 10 wherein said noncontact sensor comprises a photosensor.

12. A harvesting apparatus as claimed in claim 1 wherein said removal means is fixed to said harvesting apparatus, and said catch means is movable by action of said drive means to vary the relative position between said removal means and said catch means.

13. A harvesting apparatus as claimed in claim 1 wherein said catch means is fixed to said harvesting apparatus, and said removal means is movable by action of said drive means to vary the relative position between said catch means and said removal means.

14. A harvesting apparatus as claimed in claim 1 wherein both of said catch means and said removal means are movable by action of said drive means.

15. A harvesting apparatus for automatically removing fruit from its growth source, comprising;
    a harvesting hand including catch means for catching fruit by means of a vaccuum, removal means for removing the fruit caught by said catch means, drive means for varying a relative position of said catch means and said removal means between a first position in which said catch means is disposed closer than said removal means is to the fruit and a second position in which said removal means is closer than said catch means is to the fruit, and an articulated arm assembly,
    image pickup means for picking up an image of fruit to be harvested, and
    control means for guiding said harvesting hand to the fruit in response to information provided by said image pickup means such that said catch means approaches the fruit at a lateral side thereof,
    wherein said first position is a position for a guide operation with respect to the fruit and said second position is a position for a fruit removal operation.

* * * * *